United States Patent [19]

Fenske

[11] Patent Number: 5,328,587

[45] Date of Patent: Jul. 12, 1994

[54] METHOD OF MAKING MACHINE-ENGRAVED SEAMLESS TUBE

[75] Inventor: Willi Fenske, Richmond, Va.

[73] Assignee: IR International, Inc., Sandston, Va.

[21] Appl. No.: 976,849

[22] Filed: Nov. 16, 1992

[51] Int. Cl.[5] .......................... C25D 1/08; C25D 7/04; B23P 9/02; C23F 1/02

[52] U.S. Cl. ............................ 205/73; 205/75; 156/644; 156/645; 156/664; 29/163.6

[58] Field of Search .................. 205/73, 75; 156/644, 156/645, 660; 29/163.6, 163.8, 423

[56] References Cited

U.S. PATENT DOCUMENTS

| | | | |
|---|---|---|---|
| 1,996,394 | 4/1935 | Wodehouse | 100/47 |
| 2,226,383 | 12/1940 | Norris | 156/644 |
| 2,337,016 | 12/1943 | Hillix et al. | 76/107 |
| 2,753,781 | 7/1956 | Anander | 271/2.3 |
| 2,908,068 | 10/1959 | Biel et al. | 29/121 |
| 3,597,818 | 8/1971 | Beck | 29/121 |
| 3,616,278 | 10/1971 | Jansen | 205/75 |
| 3,713,997 | 1/1973 | Anselrode et al. | 205/73 |
| 3,735,615 | 5/1973 | Schneider | 72/75 |
| 3,763,030 | 10/1973 | Zimmer | 205/73 |
| 3,923,610 | 12/1975 | Bergin et al. | 204/32 R |
| 4,029,249 | 6/1977 | Nagel et al. | 226/95 |
| 4,151,240 | 4/1979 | Lucas et al. | 264/504 |
| 4,214,945 | 7/1980 | Lucas et al. | 29/163.6 |
| 4,233,017 | 11/1980 | Lucas et al. | 425/290 |
| 4,341,603 | 7/1982 | Heidborn | 156/644 |
| 4,366,025 | 12/1982 | Gordon, Jr. et al. | 162/358 |
| 4,383,896 | 5/1983 | Pruyn et al. | 204/11 |
| 4,496,434 | 1/1985 | Morssinkhof | 204/11 |
| 4,567,827 | 2/1986 | Fadner | 101/350 |
| 4,641,411 | 2/1987 | Meulen | 29/424 |
| 4,794,680 | 1/1989 | Meyerhoff et al. | 29/132 |
| 4,879,791 | 11/1989 | Herb | 29/148 |
| 4,912,824 | 4/1990 | Baran | 29/121.2 |
| 4,913,783 | 4/1990 | Piolot | 205/75 |
| 4,914,796 | 4/1990 | Lioy et al. | 29/121.2 |
| 4,978,583 | 12/1990 | Wakui et al. | 428/600 |
| 5,001,821 | 3/1991 | Herb | 29/121.2 |

FOREIGN PATENT DOCUMENTS 2746440 10/1977 Fed. Rep. of Germany.

OTHER PUBLICATIONS

A. C. Hart, "Electroforming Holloware", Industrial Finishing and Surface Coatings, vol. 25, No. 299, May 1973, pp. 14, 16, 18, 20.

Primary Examiner—John Zimmerman
Attorney, Agent, or Firm—Millen, White, Zelano, & Branigan

[57] ABSTRACT

A method of making a perforated tubular member by supporting a thin stainless tube (10) on a mandrel; machine engraving funnel-shaped holes (12) through the tube (10) and removing the machine-engraved tube from the mandrel. An alternate embodiment applies an intermediate layer (22) of aluminum to a core roll (20); applies a plurality of metallic layers (24) to the intermediate layer (22); machine engraves funnel-shaped holes (12) through the metallic layers (24); etches away the intermediate layers (22) and removes the machine-engraved tube. A third embodiment applies a separating-chemical layer (32) to a core roll (30); electro plates a plurality of metallic layers (34); machine engraves funnel-shaped holes (12); into the metallic layers (34); releases the resulting tube from the separating layer (32); and removes the resulting tube from the core roll.

22 Claims, 1 Drawing Sheet

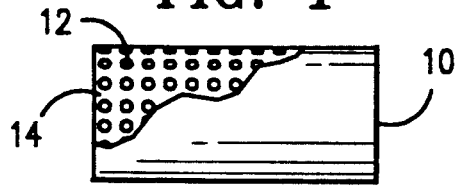
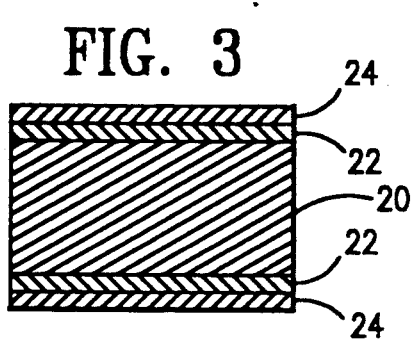
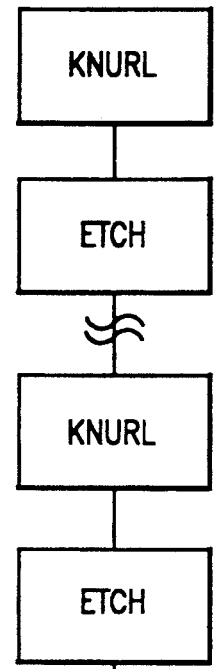
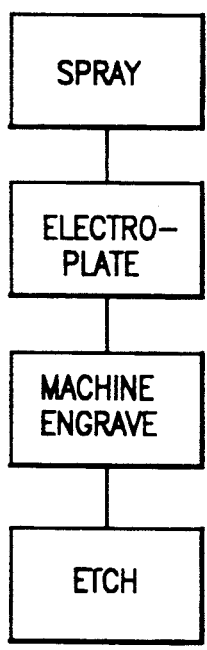
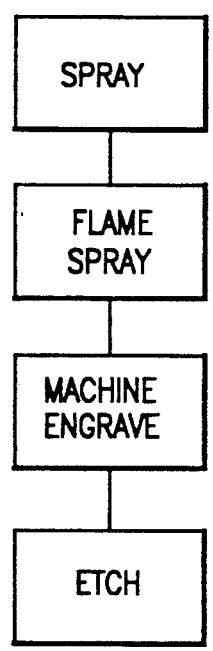
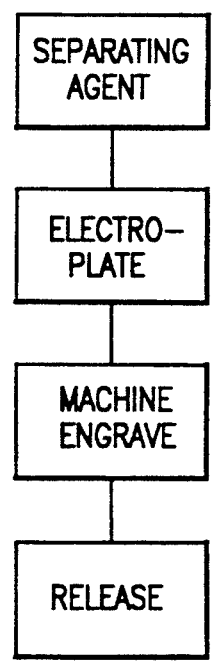
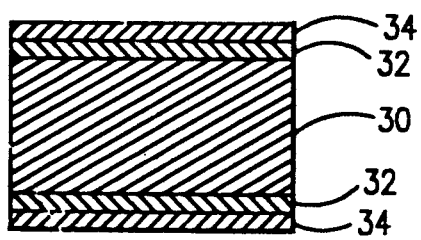

METHOD OF MAKING MACHINE-ENGRAVED SEAMLESS TUBE

This invention relates to perforated metallic tubes and more particularly to a method for making seamless, cylindrical, perforated tubes having an accurately-controlled structure.

Perforated cylindrical screens have been used in the perforation of thermal plastic films, the manufacture of absorbent devices, paper making, food processing, and printing, among others.

One such screen is described in U.S. Pat. No. 4,214,945 wherein a perforated, inside-out tubular member is slit, reverse-curvature rolled, and welded to form a right-side-out tubular shape. The inside-out tubular member of the '945 patent is typically formed by a method which includes the electroplating of copper, nickel, or the like upon a cylinder coated with an intermediate layer of an etchable material such as aluminum. The intermediate layer has cones machine-engraved thereon so that the outer layers, such as nickel or copper that are electroplated thereover also take on the cone shapes. The tips of the cones are then ground off to provide access for etchant to the intermediate layer and to provide perforations in the tube that is removed after the intermediate layer is etched away.

Other techniques for forming tubular screens employ teachings such as those of U.S. Pat. Nos. 4,383,896 and 4,496,434. Such techniques customarily apply a resist or the like to a roll comprised of a material such as stainless steel. Material such as nickel or copper is then electroplated wherever the resist is absent to a typical thickness of about 0.005–010 cm. The thusly-electroplated skeleton is then removed to result in a thin perforated screen which is then further electroplated with layers of copper, nickel, or the like to result in a perforated screen having the desired thickness. As more and more material is electrolytically deposited, however, the perforate structure has a tendency to become undesirably distorted so that sharp angles become soft, square perforations become round, repeatability becomes poor, and so on. Such screens can then have a texture applied to their outer surfaces, by conventional photoengraving means.

It is an object of the instant invention to provide a seamless machine-engraved screen and a method of forming such a screen; and, it is a further object of an alternate embodiment of the invention to provide such a screen by a method which eliminates the etching step to remove the intermediate layer such as described above in connection with the '945 patent.

SUMMARY

In accordance with a first embodiment of the invention, a metallic tube is supported on a mandrel. Funnel-shaped holes are then machine-engraved into the tube. In this respect the "funnel-shaped" holes of the instant invention refer to inwardly-tapered apertures which can have cross sections that may be circular, hexagonal, octagonal, or the like. After the desired pattern is obtained, the tube is removed from the mandrel to produce a seamless, machine-engraved perforated screen that has a highly-accurate pattern and does not require slitting, recurving, or rewelding.

In accordance with a second embodiment of the invention, a core roll is coated with an intermediate layer of aluminum or the like which serves as a subsequently-removable platform upon which one or more metallic layers are applied. The metallic layers are then machine engraved to form funnel-shaped holes therein. The intermediate layer is then etched-away by a conventional material which doesn't affect the other metallic layers and leaves the perforated metallic layers intact for removal as a perforated metallic tube.

In a third embodiment, a core roll is coated with a conventional separating chemical over which one or more metallic layers are then applied. The metallic layers are then machine engraved to form the desired pattern of funnel-shaped holes therein. Pressure is then applied to the machine-engraved shell to release it from the core roll and provide an accurately-engraved seamless screen which requires neither slitting nor recurving nor rewelding nor the time and expense of using an etchant step to remove an intermediate layer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference numerals refer to like parts throughout different views. The drawings are schematic and not necessarily to scale, emphasis instead being placed upon illustrating principles of the invention.

FIG. 1 is a schematic view of a tubular member having radial, inward/tapering apertures.

FIG. 2 is a flow diagram of steps of a method of a tubular member of FIG. 1.

FIG. 3 is a schematic view of a tubular member as it is formed by an alternate method.

FIG. 4a is a flow diagram of steps of a first method of forming a tubular member illustrated in FIG. 3.

FIG. 4b is a flow diagram of steps of a second method of forming a tubular member illustrated in FIG. 3.

FIG. 5 is a schematic view of a tubular member as it is formed by another alternative method.

FIG. 6 is a flow diagram of steps for forming a tubular member as illustrated in FIG. 5.

DESCRIPTION OF PREFERRED EMBODIMENTS

In accordance with a first embodiment of the invention, a stainless steel tube 10 (FIG. 1) was supported on a conventional expandable mandrel, but a similarly conventional non-expandable mandrel can also be employed. Funnel-shaped holes 12 were then machine-engraved into and through the surface 14 of the stainless steel tube 10 by a conventional machine-engraving process.

As shown in FIG. 2, a conventional machine-engraving process includes repeated steps of knurling (so as to replace but not remove material.) Each knurling step is followed by an etching step to remove material from selected locations. In this case, the material is selectively removed at the sites of the holes 12 in the surface 14 of the stainless steel tube 10. This process is repeatedly followed as many as twenty or more times until the desired funnel-shaped hole pattern is obtained. In this respect, a major advantage of machine engraving is that the resulting angles and surface pattern are closely controlled.

After the desired hole pattern is obtained, the thusly-machine-engraved tube is removed from the mandrel to produce a seamless, machine-engraved, perforated screen that has a highly-accurate pattern of funnel-shaped holes through the stainless steel tube 10. Significantly, the Just-described process does not require slitting, recurring, or rewelding.

A drawback of the Just-described embodiment is that it is difficult to obtain accurate support of the initial stainless steel tube on the mandrel; and, the method does not lend itself to producing long-length perforated tubes because suitable raw material is not readily available. When care has been exercised, however, the method has been used to provide accurately-engraved funnel-shaped holes in selected locations of short lengths of tubing such as stainless steel.

In accordance with a second embodiment of the method of the invention, a core roll of steel 20 (FIG. 3) was conventionally sprayed with an intermediate layer of aluminum 22 or the like. Where an intermediate layer of aluminum was employed, it was applied by means of an aluminum wire which was heated to a fluid temperature and the fluid aluminum was blown onto core roll 20 to form the layer 22. The thickness of the intermediate layer 22 is not critical so long as subsequently-deposited layers 24 can be removed from the core roll 20 when the intermediate layer is removed, but a thickness of 0.050 cm. has been found to be satisfactory.

After deposition the aluminum was then conventionally electroplated with one or more layers 24 of nickel, copper, silver, or the like as illustrated in the first two steps of FIG. 4a. This electroplating was continued until the thickness of electroplated material reached about 0.0635 cm.

Alternatively, as shown in the first two steps of FIG. 4b, the outer layers of nickel, copper, silver, or the like 24 can be flame sprayed onto the intermediate layer 22, but such sprayed layers have a tendency to develop cracks during the engraving process about to be described. Hence, it is preferable that the layers 24 be electroplated.

As a still further alternative, where nickel is used, the layer(s) 24 can be applied by a conventional electroless-nickel technique.

After deposition, the electroplated or sprayed layers 24 are then machine-engraved as shown in FIGS. 4a and 4b in the manner described above in connection with FIG. 2. The intermediate layer 22 is then etched away with a suitable etchant such as muriatic acid in the case of an aluminum intermediate layer 22. In this respect, the etchant is selected so that it does not react substantially, if at all, with the electroplated or sprayed layers 24. After the intermediate layer is removed as described above, the thusly-engraved cylinder is removed from the core roll 20 as a fully-formed, relatively-thin, perforated tubular member without there having been any requirement for slitting, recurving, rewelding, or the use of any separating agents.

In a third and most preferred embodiment, a core roll 30 (FIG. 5) is comprised of a suitable metal such as steel (or a suitable non-metallic material such as, for example, carbon fiber or a composite which can include fiberglass, plastic, or the like.) In this respect, a significant requirement of the core roll 30 is that it be able to withstand the forces that are developed during subsequent machine-engraving steps. Hence, the core roll 30 should be structured accordingly. The core roll 30 is first coated with a conventional electroplating separating chemical 32 (as shown in the first step of FIG. 6). Suitable separating agents are conventional and include, for example, a dilute chromic acid solution, a nickel-plating solution, or a similar separating agent such as a copper-parting agent marketed under the "Cuflex" name.

Where a carbon fiber or composite core roll 30 is employed, before application of the separating agent, it is desirable to apply a conventional sensitizing agent to the roll 30; and, it is also desirable that the sensitizing agent be covered, for example, with a layer of nickel or the like before the separating agent 32 is applied.

After the separating chemical has dried, the core roll is electroplated with layers 34 of machine-engravable materials such as nickel, copper, silver or the like (as shown in the second step of FIG. 6.) As described above, the layers 34 can also include the application of electroless nickel. In either case, the layers 34 are then machine engraved (as illustrated in the third step of FIG. 6) in the manner described above in connection with FIG. 2 to form the desired funnel-shaped hole pattern through the layers 34.

The machine-engraved shell (comprised of the perforated layers 34) is then released from the core roll 30 by application of a sufficient force, such as by application of a pressure roll, to release the machine-engraved metallic tube 34 from the separating layer and core roll 30. In this manner, the method provides an accurately-engraved, conically-perforated, seamless screen that requires neither slitting nor recurving nor rewelding nor the time and expense of an expensive messy etchant step to remove an intermediate layer such as the aluminum layer of the type described above in connection with the FIG. 3 embodiment (the steps of which are illustrated in FIGS. 4a and 4b.)

The various above-cited patents are incorporated herein by reference; and, while the invention has been particularly shown and described with reference to preferred embodiments thereof, it will be understood by those skilled in the art that various changes and modifications in form and details may be made therein without departing from the spirit and scope of the invention.

The embodiments of the invention in which an exclusive property or privilege is claimed are defined as follows:

1. A method of making a perforated tubular member having a relatively thin tubular wall of metal which is perforated by an array of radial, inwardly-tapered apertures, said method comprising the steps of:
   Supporting a metallic tube on a mandrel;
   machine engraving funnel-shaped holes through said metallic tube, said machine engraving comprising repeated knurling steps, each said knurling step followed by an etching step to remove metal from selected locations on the knurled metal tube to form said funnel-shaped holes therein; and,
   removing the thusly-machine-engraved tube from said mandrel whereby accurately-dimensioned, funnel-shaped holes are formed in the tubular member without requiring separating agents, multiple-layer deposition, slitting, recurving, or rewelding.

2. The method of claim 1 wherein said metallic tube is comprised essentially of stainless steel.

3. The method of claim 1 wherein said supporting step includes the placement of said metallic tube upon an expandable mandrel.

4. A method of making a perforated tubular member having a relatively thin tubular wall of metal which is perforated by an array of radial, inwardly-tapered apertures, said method comprising the steps of:
   Applying an intermediate layer of etchable material onto a core roll;

Applying at least one metallic layer to said intermediate layer to form a metallic tube thereon;

machine engraving funnel-shaped holes into said metallic tube, said machine engraving comprising repeated knurling steps, each said knurling step followed by an etching step to remove metal from selected locations on the knurled metal tube to form said funnel-shaped holes therein;

etching away said intermediate layer; and, removing the thusly-machine-engraved tube from said core roll whereby accurately-dimensioned, funnel-shaped holes are formed in the tubular member without requiring separating agents, slitting, recurving, or rewelding.

5. The method of claim 4 wherein said core roll is comprised of steel.

6. The method of claim 4 wherein said intermediate layer is sprayed onto said core roll.

7. The method of claim 4 wherein said intermediate layer is comprised of aluminum.

8. The method of claim 7 wherein said intermediate layer of aluminum is sprayed over said core roll.

9. The method of claim 4 wherein said at least one metallic layer is comprised of a metal selected from the group consisting of nickel, copper, silver, and alloys thereof.

10. The method of claim 4 wherein said at least one metallic layer includes a plurality of layers of metal selected from the group consisting of nickel, copper, silver, and alloys thereof, said plurality of layers being applied to a thickness of about 0.0635 cm.

11. The method of claim 4 wherein said at least one metallic layer is electroplated onto said intermediate layer.

12. The method of claim 4 wherein said at least one metallic layer is flame sprayed onto said intermediate layer.

13. The method of claim 4 wherein said intermediate layer is comprised of aluminum and wherein muriatic acid is used to etch away said aluminum.

14. A method of making a perforated tubular member having a relatively thin tubular wall of metal which is perforated by an array of radial, inwardly-tapered apertures, said method comprising the steps of:

applying a separating layer of an electroplating separating chemical to a core roll;

Applying at least one metallic layer over said separating layer;

machine engraving funnel-shaped holes into said at least one metallic layer, said machine engraving comprising repeated knurling steps, each said knurling step followed by an etching step to remove metal from selected locations on the knurled metal tube to form said funnel-shaped holes therein;

Applying sufficient force to said machine-engraved metallic tube to release said machine-engraved metallic tube from said separating layer; and, removing the thusly-machine-engraved metallic tube from said mandrel whereby accurately-dimensioned, funnel-shaped holes are formed in the metallic tubular member without requiring slitting, recurving, or rewelding.

15. The method of claim 14 wherein said core roll is comprised of a material selected from the group consisting of steel, carbon fiber and a composite.

16. The method of claim 14 wherein said at least one metallic layer is comprised of a metal selected from the group consisting of nickel, copper, silver, and alloys thereof.

17. The method of claim 14 wherein said at least one metallic layer includes a plurality of layers of metal selected from the group consisting of nickel, copper, silver, and alloys thereof, said plurality of layers being applied to a total thickness of about 0.0635 cm.

18. The method of claim 14 wherein said separating chemical comprises a chemical selected from the group consisting of a dilute chromic acid solution, a nickel plating solution and a copper parting agent.

19. The method of claim 18 wherein said core roll is comprised of a material selected from the group consisting of steel, carbon fiber and a composite.

20. The method of claim 19 wherein said at least one metallic layer is comprised of a metal selected from the group consisting of nickel, copper, silver, and alloys thereof.

21. The method of claim 19 wherein said at least one metallic layer includes a plurality of layers of metal selected from the group consisting of nickel, copper, silver, and alloys thereof.

22. The method of claim 21 wherein said plurality of layers are applied to a total thickness of about 0.0635 cm.

* * * * *